United States Patent
Song et al.

(10) Patent No.: US 6,785,065 B1
(45) Date of Patent: Aug. 31, 2004

(54) OPTICAL PICKUP ACTUATOR DRIVING METHOD AND APPARATUS THEREFOR

(75) Inventors: Byung-youn Song, Gyeonggi-do (KR); Kyung-sik Shin, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/772,339

(22) Filed: Feb. 6, 2004

Related U.S. Application Data

(63) Continuation of application No. 10/173,958, filed on Jun. 19, 2002, now Pat. No. 6,721,110.

(30) Foreign Application Priority Data

Jun. 19, 2001 (KR) .......................................... 2001-34687

(51) Int. Cl.[7] .................................................. G02B 7/02
(52) U.S. Cl. ........................ 359/814; 359/824; 369/44.15
(58) Field of Search .............................. 359/814, 824, 359/813, 811; 369/44.15

(56) References Cited

U.S. PATENT DOCUMENTS

| | | | |
|---|---|---|---|
| 4,479,051 A | 10/1984 | Musha | |
| 5,208,703 A | 5/1993 | Ikegame et al. | |
| 5,663,840 A | 9/1997 | Matsui | |
| 6,580,569 B2 * | 6/2003 | Choi et al. | 359/814 |
| 6,639,744 B2 * | 10/2003 | Ohno | 359/824 |

* cited by examiner

Primary Examiner—Hung X. Dang
(74) Attorney, Agent, or Firm—Staas & Halsey, LLP

(57) ABSTRACT

An optical pickup actuator includes a bobbin. At least one focus coil and at least one track coil are arranged at both sides of the bobbin to secure the remaining sides of the bobbin. The optical pickup actuator can drive an optical pickup in a focus direction, a track direction, and a tilt direction. The focus coil is also used as the tilt coil. An optical pickup actuator is driven by arranging a bobbin on a base of the optical pickup actuator so as to be moved by support members, installing at least one focus and tilt coil to drive the bobbin in focus and tilt directions and at least one track coil to drive the bobbin in a track direction at opposite side surfaces of the bobbin, arranging magnets to face corresponding sides of the opposite side surfaces of the bobbin, and dividing the focus and tilt coils into at least two sets of coils and applying an input signal to each of the sets. Since driving in the focus direction and the tilt direction can be controlled together by a single coil, the number of the support members can be reduced and the defective ratio can be lowered. Accordingly, the three axes driving and the four axes driving can be stably implemented.

10 Claims, 8 Drawing Sheets

OPTICAL PICKUP ACTUATOR DRIVING METHOD AND APPARATUS THEREFOR

CROSS-REFERENCE TO RELATED APPLICATIONS

This application is a continuation of U.S. patent application Ser. No. 10/173,958, filed Jun. 19, 2002 now U.S. Pat. No. 6,721,110, and claims the benefit of Korean Patent Application No. 2001-34687 filed on Jun. 19, 2001, in the Korean Industrial Property Office, the disclosures of which are incorporated herein by reference.

BACKGROUND OF THE INVENTION

1. Field of the Invention

The present invention relates to an apparatus and a method of driving an optical pickup actuator, and more particularly, to an apparatus and a method of driving an optical pickup actuator in which a focus coil, a track coil, and a tilt coil which drive an optical pickup in a focus direction, a track direction, and a tilt direction, respectively, are provided at both sides of a bobbin to secure the remaining sides of the bobbin, and the focus coil is also used as the tilt coil.

2. Description of the Related Art

In general, optical pickups are adopted in optical recording/reproducing apparatuses. An optical pickup performs recording and/or reproduction of information with respect to a recording medium, such as an optical disk, placed on a turntable in a non-contact manner while moving in a radial direction of the optical disk.

The optical pickup includes an objective lens which forms a light spot on the optical disk by focusing light emitted from a light source, and an actuator which controls the objective lens in a track direction, a focus direction, and a tilt direction so as to accurately place the light spot formed by the objective lens on the optical disk.

The optical pickup actuator includes a double axes driving actuator which drives the optical pickup in the track direction and the focus direction. Recently, to perform a high density recording, the N/A of the objective lens has been increased and the wavelength of a laser has been decreased. However, a margin in tilt of the optical pickup actuator decreases in response to increase of the N/A and decrease of the wavelength. To compensate for the reduced tilt margin, three axes or four axes driving actuators capable of driving an optical pickup in the tilt direction are needed in addition to the existing double axes driving actuator. The three axes driving refers to driving in the focus direction, the track direction, and the tilt direction. The four axes driving refers to driving in the focus direction, the track direction, a tilt radial direction, and a tilt tangential direction. Referring to FIG. 1, the focus direction, the track direction, the tilt radial direction, and the tilt tangential direction are indicated by L–L', M–M', N, and O, respectively.

FIG. 1 shows a conventional optical pickup actuator which includes a base 100, a holder 103 fixed to the base 100, a bobbin 107 where an objective lens 105 is mounted, wires 109 which connect the bobbin 107 to the holder 103, and a magnetic driving portion (described below) which moves the bobbin 107 in the track direction, the focus direction, or the tilt direction.

The magnetic driving portion includes a couple of a focus coil 110 and a tilt coil 112 (see FIG. 2A) provided at each of the opposite side surfaces 107a of the bobbin 107, a track coil 115 arranged at each of the other side surfaces 107b where the focus coils 110 and the tilt coils 112 are not arranged, and first and second magnets 117 and 119 installed on the base 100 to face the focus coils 110, the tilt coils 112, and the track coils 115 with corresponding predetermined intervals therebetween. Outer yokes 118 and 120 which fix the first and second magnets 117 and 119 are installed on the base 100. Inner yokes 122 are installed on the base 100 at corresponding positions facing the first magnets 117 to guide the bobbin 107. The outer yokes 118 and 120 and the inner yokes 122 guide a path of magnetism generated by the first and second magnets 117 and 119 to direct the bobbin 107 to a desired location.

Each of the wires 109 has one end soldered to a corresponding area of both the opposite and other side surfaces of the bobbin 107 and the other end connected to the holder 103, and is electrically connected to a circuit portion (not shown) which applies current to the magnetic driving portion.

FIG. 2A shows an example of the polarity of the first magnet 117 and the direction of current I to disclose the relationship of forces by the interaction between the focus coil 110 and the tilt coil 112, and the first magnet 117 corresponding thereto. Here, the focus coil 110 provided at each of the opposite side surfaces 107a of the four side surfaces of the bobbin 107 receives a force $F_f$ by Fleming's left hand rule so that the bobbin 107 is moved in the focus direction L. Where the direction of the current I changes to the opposite, the focus coil 110 receives a force in the opposite direction L'.

The tilt coil 112 is provided at both opposite side surfaces 107a of the bobbin 107, forms a couple with the corresponding focus coil 110, and interacts with the corresponding first magnet 117. Here, where the same currents flowing in the opposite directions are applied to the tilt coils 112, the forces $F_{ti}$ received by the both tilt coils 112 become opposite so as to drive the optical pickup in the tilt direction, in particular, in the radial tilt direction (N).

FIG. 2B shows an example of the polarity of the second magnet 119 and the direction of current I to disclose the relationship of forces by the interaction between the track coil 115 and the second magnet 119 corresponding thereto. The direction and magnitude of forces between a magnet and a coil is determined by Fleming's left hand rule. Thus, the track coil 115 provided at each of the other side surfaces 107b of the four side surfaces of the bobbin 107, where the focus coils 110 and the tilt coils 112 are not arranged, receives the force $F_t$ in the track direction by the second magnet 119 so as to move the bobbin 107 in the track direction M. Here, where the direction of current I changes to the opposite, the track coil 115 receives a force in the opposite direction M'.

Typically, six wires 109 of the optical pickup actuator are provided to drive the bobbin 107 in the focus direction, the track direction, and the tilt direction. But, more wires may be needed for a four axes driving actuator.

However, since the optical pickup actuator is very small, where all four side surfaces of the bobbin 107 are used to install the focus coils 110, the track coils 115, or the tilt coils 112, a sufficient space may not be present to install the wires 109. In addition, when the number of the wires 109 increases, it is very difficult to attach the additional wire(s) in such a small space. Accordingly, the defective ratio of the conventional optical pickup actuators increases.

Also, when coils are arranged using all four side surfaces of the bobbin 107, wiring of the coils is complicated. Furthermore, since a magnet is provided at each of the focus coil 110, the tilt coil 112, and the track coil 115, the number of parts constituting the optical pickup actuator increases, decreasing the productivity. Additionally, interference with a spindle motor (not shown), which rotates a disc, is generated by the first magnet 117 arranged at the opposite side surfaces (left and right sides) of the bobbin 107. Therefore, the spindle motor is not accurately controlled.

SUMMARY OF THE INVENTION

Accordingly, it is an object of the present invention to provide an apparatus and a method of driving an optical pickup actuator in which a focus and tilt coil and a track coil which drive an objective lens in the focus direction, the track direction, and the tilt direction are arranged at both side surfaces of a bobbin so as to secure a sufficient space provided at the other side surfaces of the bobbin, wherein driving in the focus direction and the tilt direction can be controlled together by a single coil.

Additional objects and advantages of the invention will be set forth in part in the description which follows and, in part, will be obvious from the description, or may be learned by practice of the invention.

To achieve the above and other objects of the present invention, there is provided a method of driving an optical pickup actuator having a bobbin, a support member, focus and tilt coils, track coils, and magnets, the method comprising arranging the bobbin on a base of the optical pickup actuator so as to be moved by the support member, installing at least one focus and tilt coil to drive the bobbin in focus and tilt directions and at least one track coil to drive the bobbin in a track direction at each of opposite side surfaces of the bobbin, arranging the magnets to face the respective focus and tilt coils and the track coils, and dividing the focus and tilt coils into at least two sets of coils and applying an input signal to each of the sets.

According to an aspect of the present invention, the installation of at least one focus and tilt coil comprises arranging first and third focus and tilt coils on one side of the opposite side surfaces of the bobbin, and arranging second and fourth focus and tilt coils on the other side of the opposite side surfaces of the bobbin. The applying of the input signal comprises inputting first and second input signals to respective first and second set coils, wherein each of the first and second set coils is formed by a coupling of two of the first through fourth focus and tilt coils.

The first set coil may be formed of the first and third focus and tilt coils and the second set coil may be formed of the second and fourth focus and tilt coils. Alternatively, the first set coil may be formed of the first and second focus and tilt coils and the second set coil may be formed of the third and fourth focus and tilt coils.

The first and second input signals may be the same input signal to drive the bobbin in the focus direction. Alternatively, the first and second input signals may have different phases. On the other hand, each of the first and second input signals may comprise a sum signal of a focus signal and a corresponding tilt signal having a phase different from that of the focus signal.

Each of the magnets may have four polarizations. Alternatively, each of the magnets may comprise first magnet and second magnet parts, each part having two polarizations.

The method of driving the optical pickup actuator further includes inputting another input signal to each of the track coils independent of the focus and tilt coils.

At least one of the focus and tilt coils and the tracks may be formed of a fine pattern coil.

The support member may be arranged at other opposite side surfaces of the bobbin, wherein the focus and tilt coils and the track coils are not arranged on the other opposite side surfaces of the bobbin.

To achieve the above and other objects according to another embodiment of the present invention, there is provided a method of driving an optical pickup actuator having a bobbin, a support member, focus and tilt coils, track coils, and magnets, the method comprising arranging the bobbin on a base of the optical pickup actuator so as to be moved by the support member, installing at least one focus and tilt coil to drive the bobbin in focus and tilt directions and at least one track coil to drive the bobbin in a track direction at each of opposite side surfaces of the bobbin, arranging the magnet to face the respective focus and tilt coils and the track coils, and independently inputting a signal to each focus and tilt coil.

The same input signal may be input to at least one of the focus and tilt coils to drive the bobbin in the focus direction.

A different input signal may be applied to at least one of the focus and tilt coils to drive the bobbin in the tilt direction.

The installation of at least one focus and tilt coil may comprise arranging first and third focus and tilt coils on one side of the opposite side surfaces of the bobbin, and arranging second and fourth focus and tilt coils on the other side of the opposite side surfaces of the bobbin. The applying of the input signal may comprise inputting first and second input signals to respective first and second set coils, wherein each of the first and second set coils is formed of a selected couple of the first through fourth focus and tilt coils.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
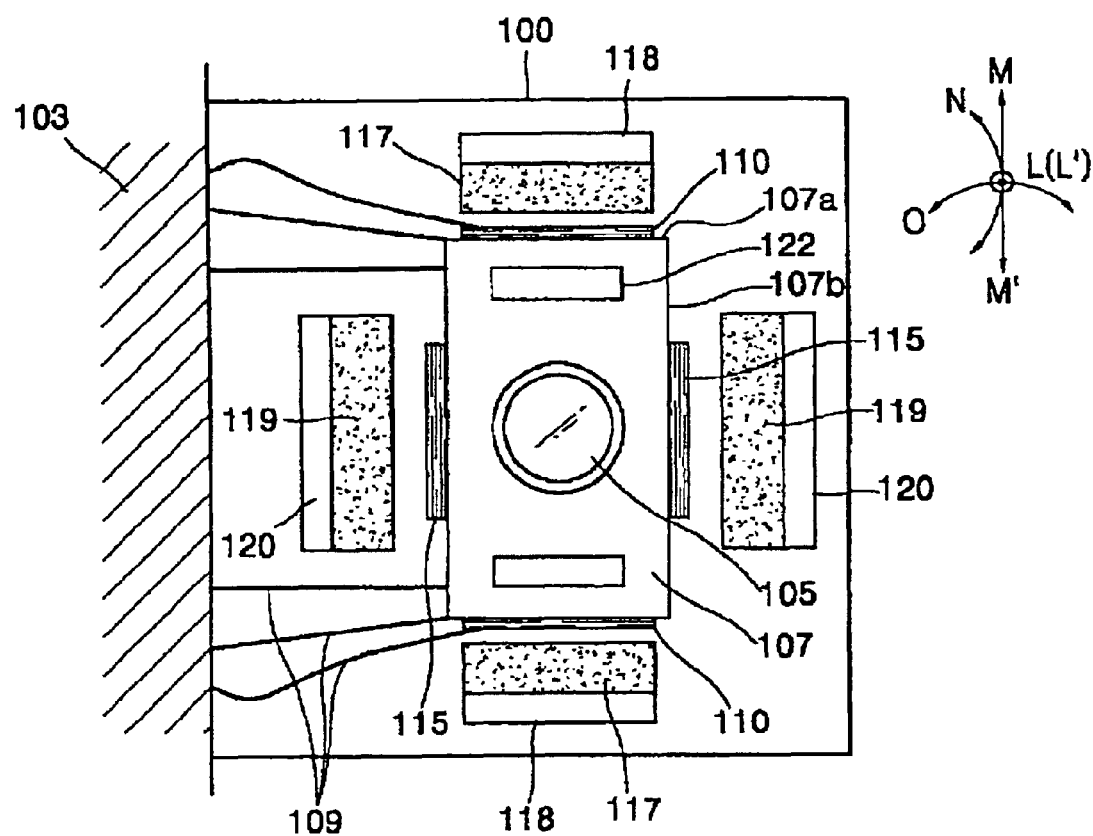
FIG. 1 is a plane view of a conventional optical pickup actuator.
Figure 2A:
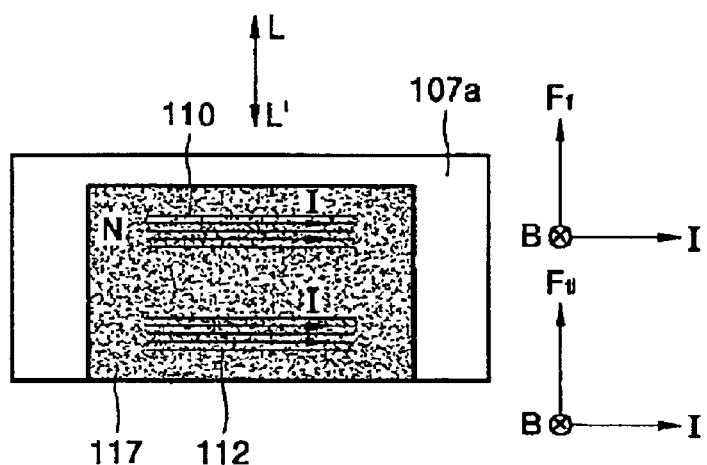
FIGS. 2A and 2B are views illustrating the relationship between a magnet and coil of the optical pickup actuator of FIG. 1.
Figure 2B:
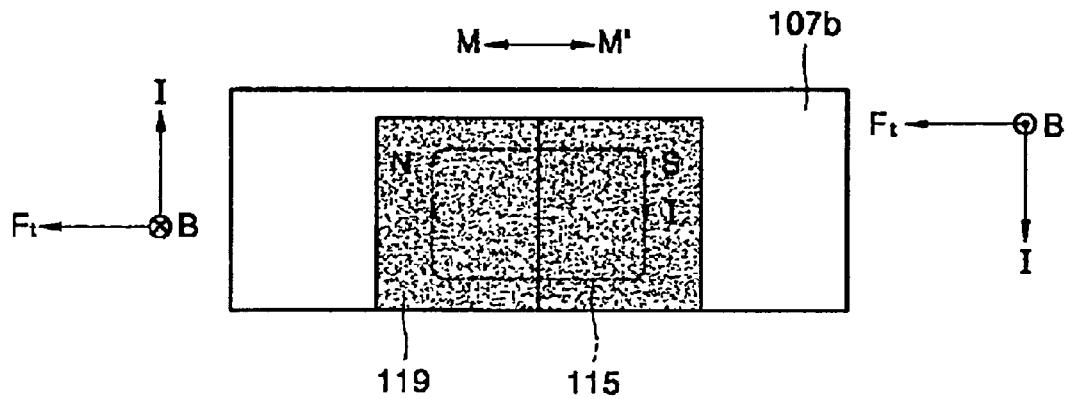

Reference will now be made in detail to the embodiments of the present invention, examples of which are illustrated in the accompanying drawings, wherein like reference numerals refer to the like elements throughout. The embodiments are described below in order to explain the present invention by referring to the figures.

To describe a method of driving an optical pickup actuator according to the present invention, an optical pickup actuator to which the present invention is adopted is described as follows.

Figure 3:
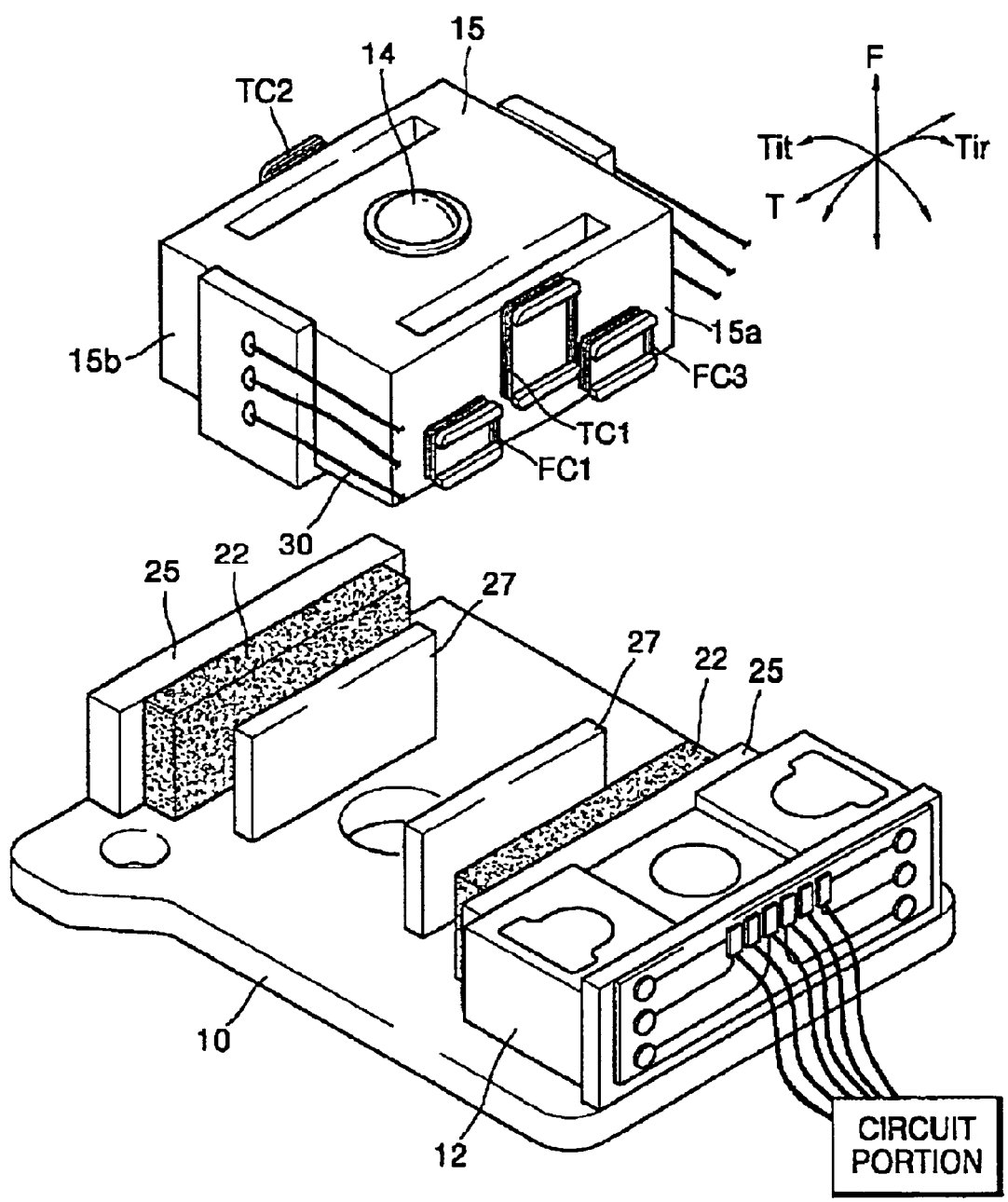
FIG. 3 is an exploded perspective view of an optical actuator according to an embodiment of the present invention.
Figure 4:
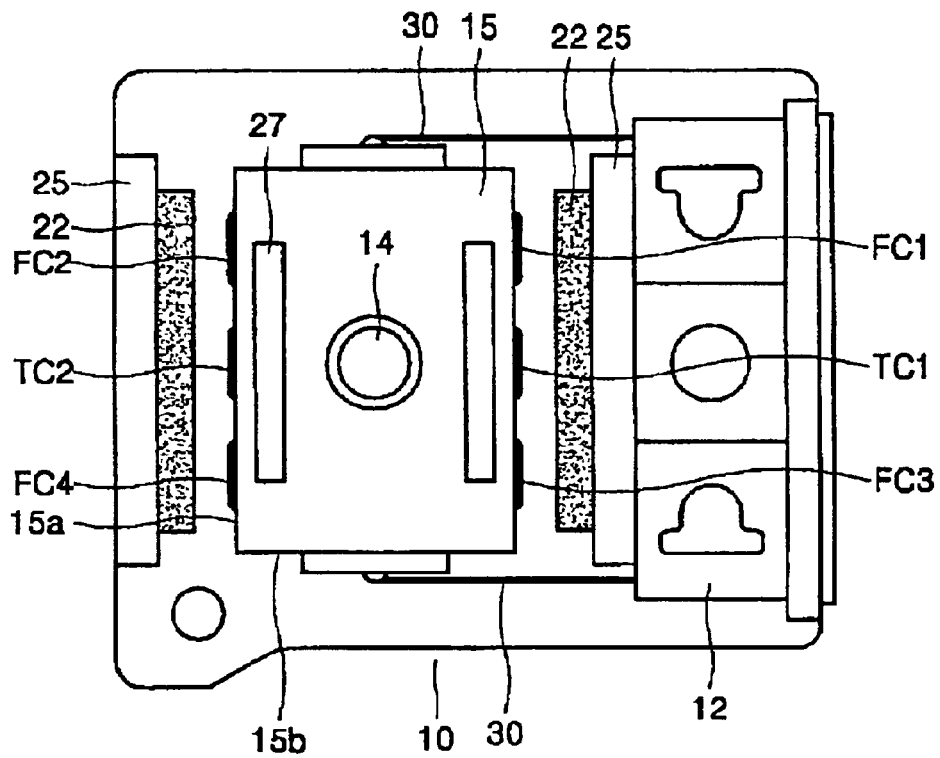
FIG. 4 is a plan view of the optical pickup actuator shown in FIG. 3.

FIGS. 3 and 4 show an optical pickup actuator according to an embodiment of the present invention. The optical pickup actuator includes a base 10, a holder 12 provided at one side of the base 10, a bobbin 15 on which an objective lens 14 is mounted, and a magnetic driving portion (described below) which drives the bobbin 14 in a focus direction, a tilt direction, and a track direction.

The magnetic driving portion includes at least one focus and tilt coil and at least one track coil provided at each of opposite side surfaces 15a of the bobbin 15, and a magnet 22 installed to face each combination of the focus and tilt coil and the track coil provided on each of the opposite side surfaces. For example, the focus and tilt coils may include first, second, third, and fourth focus and tilt coils FC1, FC2, FC3, and FC4 and the track coils may include first and second track coils TC1 and TC2 each of which is provided at the corresponding opposite side surfaces of the bobbin 15, as shown in FIG. 4. Here, the first through fourth focus and tilt coils FC1, FC2, FC3, and FC4 and the first and second track coils TC1 and TC2 are all arranged at the opposite side surfaces 15a of the bobbin 15. A support member 30 is arranged at each of the other opposite side surfaces 15b of the bobbin (where the focus and tilt coils FC1–FC4 and the tracks coils TC1–TC2 are not arranged). The support members 30 movably supports the bobbin 15 and simultaneously applies current to the first through fourth focus and tilt coils FC1, FC2, FC3, and FC4 and the first and second track coils TC1 and TC2. The support members 30 may be wires or leaf springs.

In the optical pickup actuator having the above structure, the first through fourth focus and tilt coils FC1, FC2, FC3, and FC4 are controlled to drive the object lens 14 both in the focus direction and the tilt direction.

Figure 5:
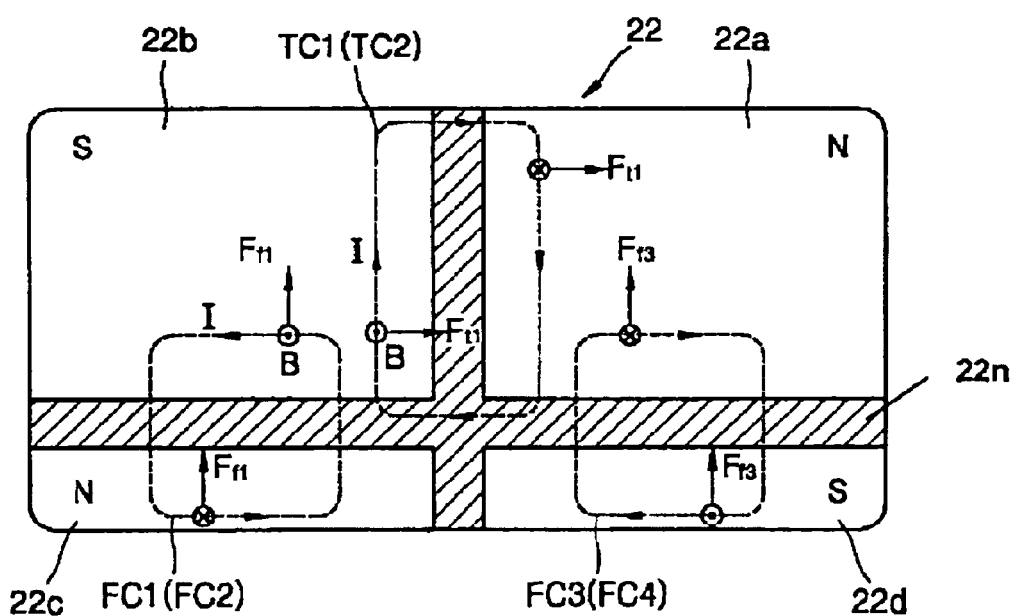
FIG. 5 is a view illustrating the relationship and arrangement of a magnet and coil of the optical pickup actuator shown in FIG. 3.

FIG. 5 shows that the magnet 22 may be divided into four sections. That is, the magnet 22 is divided into four sections in which N poles and S poles are appropriately distributed. For the convenience of explanation, the divided magnet 22 includes a first divided pole 22a, a second divided pole 22b, a third divided pole 22c, and a fourth divided pole 22d. The first divided pole 22a is an N pole, a second divided pole 22b is an S pole, a third divided pole 22c is an N pole, and a fourth divided pole 22d is an S pole. The focus and tilt coils FC1, FC2, FC3, and FC4 and the track coils TC1 and TC2 are arranged corresponding to the respective polarization 22a, 22b, 22c, and 22d of the magnet 22.

For example, each of the track coils TC1 and TC2 is arranged to face both of the first and second polarization 22a and 22b of the magnet 22, as shown in FIG. 5. A couple of the first and third focus and tilt coils FC1 and FC3 are provided at the one side surface of the opposite side surfaces 15a of the bobbin 15 and the other couple of the second and fourth focus and tilt coils FC2 and FC4 are provided at the other side surface of the opposite side surfaces 15a of the bobbin 15. The first or second focus and tilt coil FC1 or FC2 can be arranged to face both of the second and third polarization 22b and 22c while the third or fourth focus and tilt coil FC3 or FC4 can be arranged to face both of the first and fourth polarization 22a and 22d.

Alternatively, the magnet 22 may be a magnet having two polarizations. For example, a set of two magnets each having two polarizations can be arranged to be separated by a predetermined distance from each other to face the focus and tilt coils FC1, FC2, FC3, and FC4 and the track coils TC1 and TC2.

Figure 6:
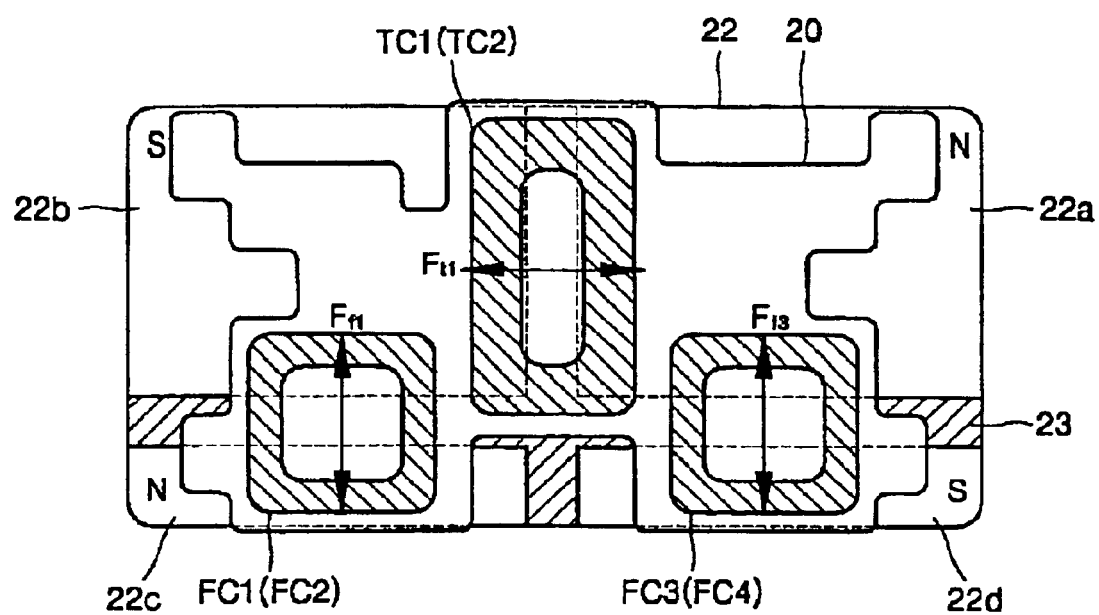
FIG. 6 is a view illustrating the relationship of forces acting between a magnet and a fine pattern coil of an optical pickup actuator according to the present invention.

Here, the focus and tilt coils FC1, FC2, FC3, and FC4 and the track coils TC1 and TC2 can be winding coils. Also, as shown in FIG. 6, at least one of the focus and tilt coils and the track coils can be a fine pattern coil 20. The fine pattern coil 20 is manufactured by patterning a coil shape on a film and can be very useful in installation of a coil in a small space.

Although the magnet 22 can have four polarizations, which are divided symmetrically, to secure effective areas of the track coils TC1 and TC2, the first and second polarizations 22a and 22b corresponding to the track coils TC1 and TC2 can be divided to have areas greater than those of the third and fourth polarizations 22c and 22d. That is, since the focus and tilt coils FC1, FC2, FC3, and FC4 use all of the first through fourth polarization 22a, 22b, 22c, and 22d while the track coils TC1 and TC2 use only the first and second polarization 22a and 22b, each of the areas of the polarization can be adjusted to balance with respect to the focus and tilt coils FC1, FC2, FC3, and FC4.

Also, a neutral zone 22n can be arranged between the respective polarizations 22a, 22b, 22c, and 22d of the magnet 22. The neutral zone 22n is provided at a boundary portion between the respective polarizations to prevent lowering of the overall lines of a magnetic force as the lines of the magnetic force are offset at a boundary area where the magnetic poles are opposite.

Referring back to FIGS. 3 and 4, outer yokes 25 and inner yokes 27 may be further provided to guide lines of a magnetic force generated by the magnets 22 in a desired direction.

A method of driving an optical pickup actuator having the structure above is described below. That is, at least one of the focus and tilt coils FC1, FC2, FC3, and FC4 and one of the track coils TC1 and TC2 are arranged at both side surfaces 15a of the bobbin 15. The focus and tilt coils are divided into at least two sets to receive first and second input signals.

Figure 7A:
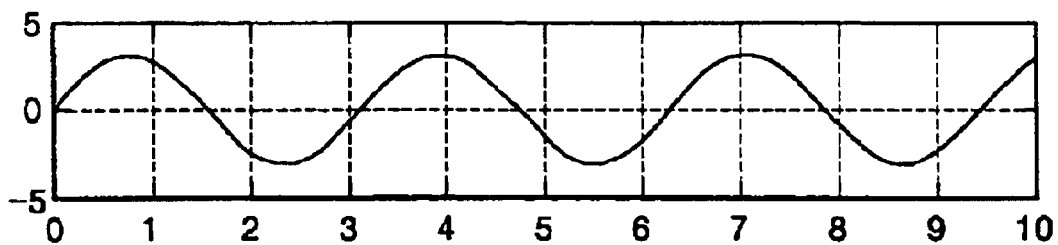
FIGS. 7A through 7C and FIGS. 8A through 8C are graphs illustrating waveforms of input signals to implement a method of driving an optical pickup actuator according to the present invention.
Figure 8A:
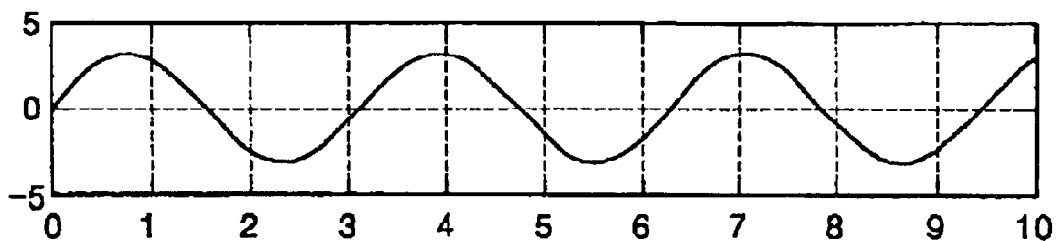

For example, FIGS. 7A and 8A show that where first and second input signals are focus signals in the same direction, the bobbin 15 moves in the focus direction F. That is, in the case in which the first and second focus and tilt coils FC1 and FC2 constitute a first set coil and the third and fourth focus and tilt coils FC3 and FC4 constitute a second set coil, where the same signal is applied to both of the first and second set coils, the first through fourth focus and tilt coils FC1, FC2, FC3, and FC4 receive the same forces in the upward or downward direction by the interaction with the magnets 22. Thus, the bobbin 15 can be driven in the focus direction F.

Figure 7B:
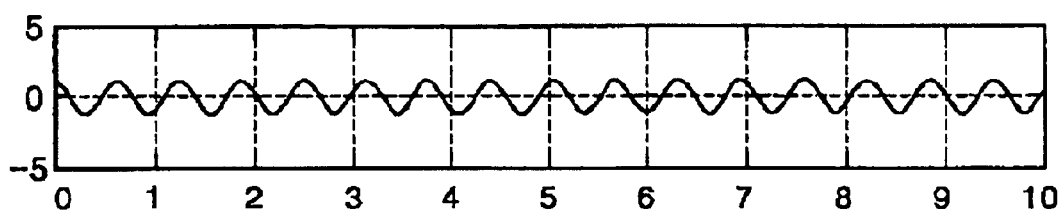
Figure 8B:
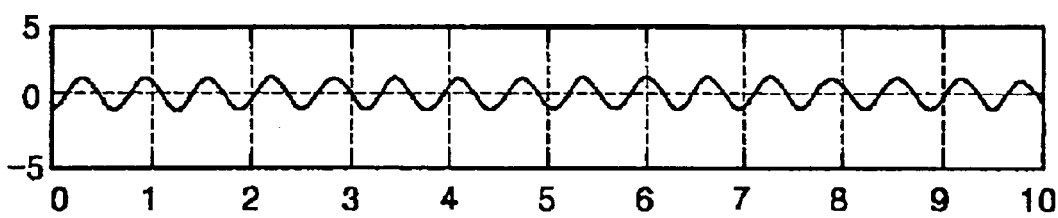

In contrast, where the first and second input signals different from each other are input to the first and second focus and tilt coils FC1 and FC2 and the third and fourth focus and tilt coils FC3 and FC4, the focus and tilt coils receive forces in the upward or downward direction that are opposite to each other at the left and right sides. Here, for example, the first input signal, as shown in FIG. 7B, is input to the first and second focus and tilt coils FC1 and FC2, and the second input signal, as shown in FIG. 8B, having a phase different from that of the first input signal is input to the third and fourth focus and tilt coils FC3 and FC4. Accordingly, driving of the bobbin 15 in a tilt radial direction Tir can be controlled.

Furthermore, an input signal may be input to each of the tracks coils TC1 and TC2, independent of the focus and tilt coils FC1–FC4, to drive the bobbin 15 in the track direction T.

Figure 9:
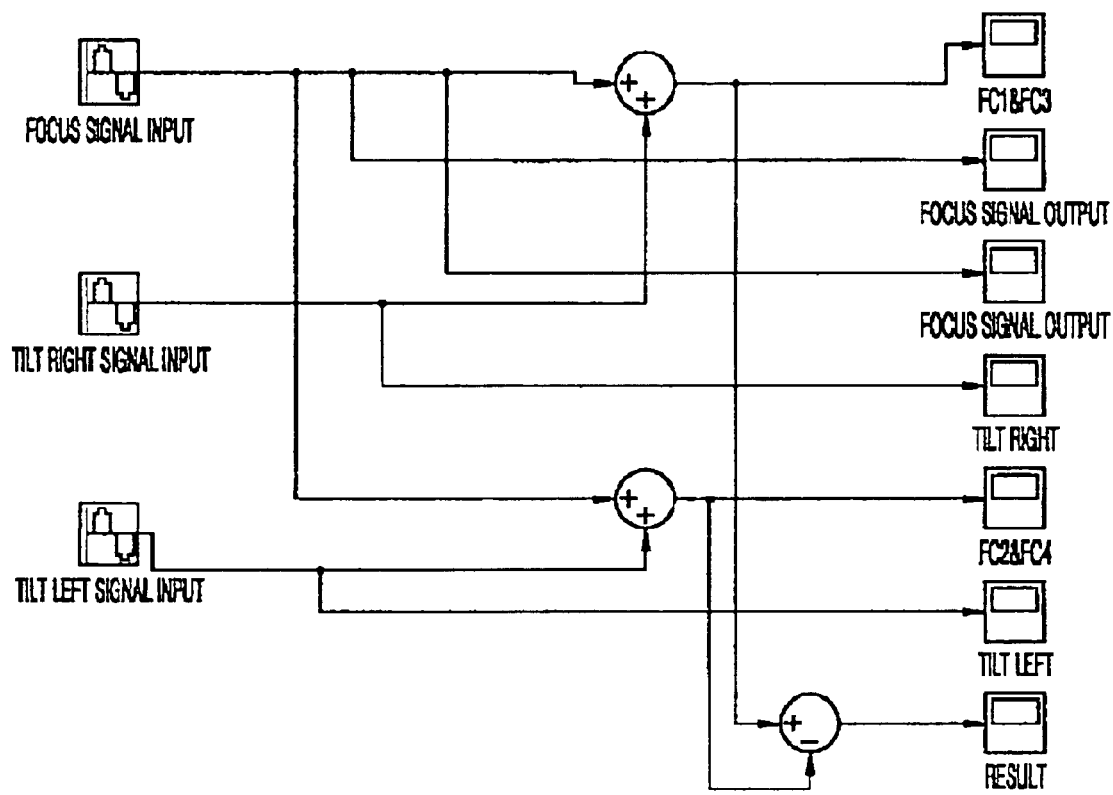
FIG. 9 is a circuit diagram to implement a method of driving an optical pickup actuator according to the present invention.

As describe above, by having the first and second focus and tilt coils FC1 and FC2 and the third and fourth focus and tilt coils FC3 and FC4 as the first set coil and the second set coil, respectively, and having the first and second track coils TC1 and TC2, driving of the bobbin 15 along three axes of the focus direction F, the track direction T, and the radial tilt direction Tir is possible. FIG. 9 shows a circuit diagram for the above case.

Alternatively, the first and third focus and tilt coils FC1 and FC3 of the first through fourth focus and tilt coils FC1, FC2, FC3, and FC4 may form a first set coil and the second and fourth focus and tilt coils FC2 and FC4 may form a second set coil. Here, where first and second input signals having phases different from each other are input to the first set coil and the second set coil, respectively, driving of the bobbin 15 in a tangential tilt direction Tit is possible.

Figure 7C:
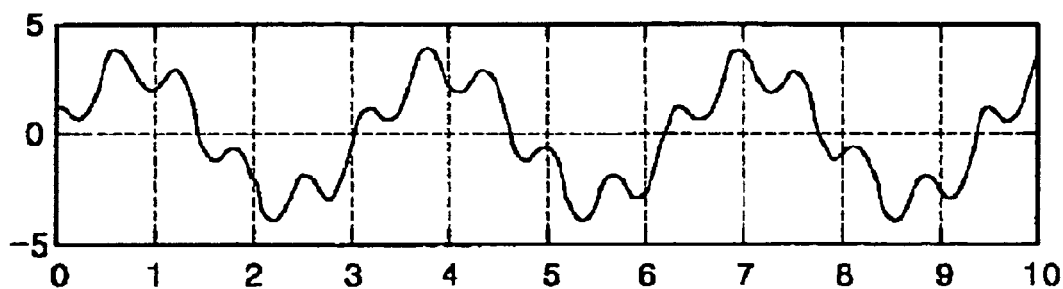
Figure 8C:
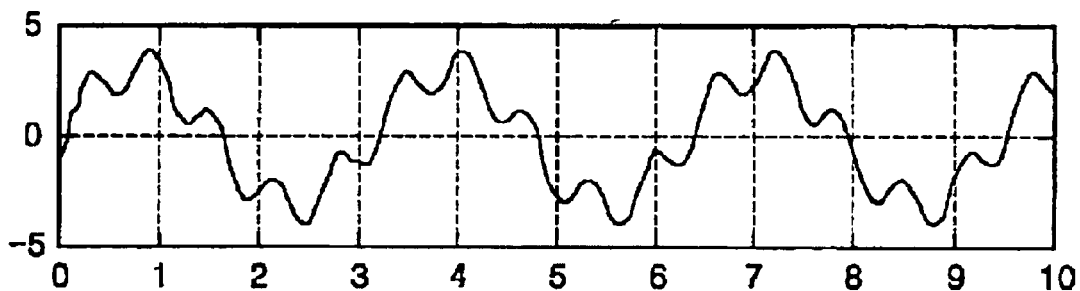

In addition to the above method of independently controlling the driving of the bobbin 15 in the focus direction and the tilt direction, the driving of the bobbin 15 in the focus and tilt directions can be simultaneously controlled by applying a sum signal of the first and second input signals for driving in the tilt direction as a signal for driving in the focus direction. That is, a sum signal (FIG. 7C) of the focus driving signal (FIG. 7A) and the first input signal (FIG. 7B) for driving in the tilt direction is input to the first set coil. A sum signal (FIG. 8C) of the focus driving signal (FIG. 8A) and the second input signal (FIG. 7C) for driving in the tilt direction is input to the second set coil. Thus, driving in the focus direction F, and the tilt radial direction Tir or the tangential tilt direction Tit can be controlled simultaneously.

Here, the first set coil is formed of the first and second focus and tilt coils FC1 and FC2 and the second set coil is formed of the third and fourth focus and tilt coils FC3 and FC4. By doing so, the driving in the focus direction F and the driving in the radial tilt direction Tir can be controlled together. Alternatively, the first set coil can be formed of the first and third focus and tilt coils FC1 and FC3 and the second set coil is formed of the second and fourth focus and tilt coils FC2 and FC4. By doing so, the driving in the focus direction F and the driving in the tangential tilt direction Tit can be controlled together.

The present invention further provides a method of independently applying a signal to each of the first through fourth focus and tilt coils FC1, FC2, FC3, and FC4. That is, where the focus signal (see FIGS. 7A and 8A) is identically applied to the first through fourth focus and tilt coils FC1, FC2, FC3 and FC4, the bobbin 15 move up and down and is driven in the focus direction F.

In contrast, the driving in the tilt radial direction Tir and the driving in the tilt tangential direction Tit can be controlled by selectively inputting an input signal to each of the first through fourth focus and tilt coils FC1, FC2, FC3, and FC4. For example, the first and second focus and tilt coils FC1 and FC2 of the first through fourth focus and tilt coils FC1, FC2, FC3, and FC4 can form a first set, and the third and fourth focus and tilt coils FC1 and FC3 can form a second set. Alternatively, the first and third focus and tilt coils FC1 and FC3 can form a first set, and the second and fourth focus and tilt coils FC2 and FC4 can form a second set.

Here, by inputting a predetermined first input signal (FIG. 7B) to the first set and the second input signal (FIG. 8B) having a phase different from that of the first input signal to the second set, the driving in the tilt radial direction Tir and in the tilt tangential direction Tit can be selectively controlled.

Furthermore, a sum signal of the focus signal and the first or second input signal for tilt driving can be selectively input to the first through fourth focus and tilt coils FC1, FC2, FC3, and FC4. By doing so, driving in the focus direction, and driving in the radial tilt direction Tir or in the tangential tilt direction Tit can be controlled together.

On the other hand, the track coils TC1 and TC2 can move the bobbin 15 in the track direction T by interacting with the first divided pole 22a and the second divided pole 22b. Thus, four axes driving in the focus direction F, the track direction T, the radial tilt direction Tir, and the tangential tilt direction Tit is possible.

It is understood that the arrangement of the polarization of the magnets 22 and the coils FC1–FC4 and TC1–TC2 can be modified without departing from the principles and spirit of the present invention.

As described above, since focus and tilt coils and track coils are provided at opposite side surfaces of a bobbin to secure a free space at the other opposite side surfaces of the bobbin, driving in a focus direction and in a tilt direction can be controlled together by a single coil. Therefore, a support member can be easily installed at the other opposite side surfaces of the bobbin and the number of the support members can be reduced. Accordingly, the defective ratio can be lowered and the three axes driving and the four axes driving can be stably implemented.

Although a few embodiments of the present invention have been shown and described it will be appreciated by those skilled in the art that changes may be made in these embodiments without departing from the principles and spirit of the invention, the scope of which is defined in the appended claims and their equivalents.

What is claimed is:

1. An optical recording and/or reproducing apparatus for use with transferring information with respect to a recording medium, comprising:

a spindle motor rotating the recording medium;

an optical pickup including an objective lens and an actuator which actuates the objective lens so as to transfer the information with respect to the recording medium; and a control unit driving the spindle motor and the optical pickup to transfer the information with respect to the recording medium and controlling the actuator of the optical pickup in the radial, track, tilt and focusing directions, wherein the actuator comprises:

a bobbin movably arranged on a base of the actuator;

at least one focus and tilt coil which drives the bobbin in the focus and the tilt directions and at least one track coil which drives the bobbin in the track direction arranged on each of opposite side surfaces of the bobbin;

support members which move the bobbin and are provided to the other side surfaces of the bobbin, wherein the focus and tilt coils and the track coils are not arranged on the other side surfaces of the bobbin; and magnets arranged to face corresponding sides of the opposite side surfaces of the bobbin.

2. The optical recording and/or reproducing apparatus of claim 1, wherein:

one side of the opposite side surfaces of the bobbin includes first and third focus and tilt coils, and the other one side of the opposite side surfaces of the bobbin includes second and fourth focus and tilt coils.

3. The optical recording and/or reproducing apparatus of claim 2, wherein, in order to drive the actuator in the focus and tilt directions, a first input signal is applied to a first set and a second input signal is applied to a second set, and the first and second sets include corresponding ones of the first through fourth focus and tilt coils.

4. The optical recording and/or reproducing apparatus of claim 3, wherein:

the first set includes one of a pair of the first and third focus and tilt coils, and another pair of the first and second focus and tilt coils; and the second set coil includes one of a pair of the second and fourth focus and tilt coils, and a pair of the third and fourth focus and tilt coils.

5. The optical recording and/or reproducing apparatus of claim 1, wherein each of the magnets has four polarizations.

6. The optical recording and/or reproducing apparatus of claim 1, wherein each of the magnets comprises first magnet and second magnet parts, each of the first and second magnet parts having two polarizations.

7. The optical recording and/or reproducing apparatus of claim 1, wherein the support members are wires or leaf springs.

8. The optical recording and/or reproducing apparatus of claim 1, further comprising:

a holder provided at one side of the base and which receives corresponding ends of the support members;

outer yokes provided on the base and which receives a corresponding one of the magnets; and inner yokes provided on the base and which are arranged respective to the outer yokes.

9. The optical recording and/or reproducing apparatus of claim 8, wherein each of the focus and tilt coils is a single coil which directs the optical pickup apparatus in focus and tilt directions.

10. The optical recording and/or reproducing apparatus of claim 1, wherein at least one of the focus and tilt coils and the track coils is formed of a fine pattern coil.

* * * * *